United States Patent [19]

Rodgers

[11] Patent Number: 5,235,803
[45] Date of Patent: Aug. 17, 1993

[54] AUXILIARY POWER UNIT FOR USE IN AN AIRCRAFT

[75] Inventor: Colin Rodgers, San Diego, Calif.

[73] Assignee: Sundstrand Corporation, Rockford, Ill.

[21] Appl. No.: 859,159

[22] Filed: Mar. 27, 1992

[51] Int. Cl.⁵ .................... F02C 6/18; F01B 25/00; F01D 1/00
[52] U.S. Cl. .................... 60/39.07; 60/39.29; 415/48; 415/155; 415/182.1; 415/203
[58] Field of Search ............ 60/39.07, 39.23, 39.29; 415/47, 48, 49, 148, 150, 155, 182.1, 203

[56] References Cited

U.S. PATENT DOCUMENTS

| | | | |
|---|---|---|---|
| 3,292,364 | 12/1966 | Cazier | 415/203 |
| 3,504,986 | 4/1970 | Jackson | 415/11 |
| 3,937,013 | 2/1976 | Aspinwall | 60/226 R |
| 4,248,566 | 2/1981 | Chapman et al. | 415/26 |
| 4,251,985 | 2/1981 | Sullivan | 60/39.29 |
| 4,375,938 | 3/1983 | Dussourd | 415/53 |
| 4,378,194 | 3/1983 | Bandukwalla | 415/49 |
| 4,470,256 | 9/1984 | Palmer | 60/39.29 |
| 4,479,755 | 10/1984 | Skoe | 415/1 |
| 4,616,483 | 10/1986 | Leonard | 415/47 |
| 4,643,639 | 2/1987 | Caine | 415/148 |
| 4,657,481 | 4/1987 | Mowill et al. | 415/151 |
| 4,821,506 | 4/1989 | Rodgers | 415/160 |
| 4,844,690 | 7/1989 | DeLaurier et al. | 415/148 |
| 4,916,893 | 4/1990 | Rodgers | 60/39.07 |
| 4,989,403 | 2/1991 | Rodgers | 60/39.29 |
| 5,116,197 | 5/1992 | Snell | 415/148 |

Primary Examiner—Richard A. Bertsch
Assistant Examiner—Howard R. Richman
Attorney, Agent, or Firm—Wood, Phillips, Van Santen, Hoffman & Ertel

[57] ABSTRACT

Inefficiencies in the operation of auxiliary power units producing electric and hydraulic power along with bleed air resulting from independence in the demand for power may be minimized in a system including at least one bleed air consuming system (84, 86), an electrical generator (92), a hydraulic pump (90), and a turbine wheel (10, 20) for driving the generator (92) and the pump (90). Also included is a combustor (32) for receiving fuel and compressed air and producing gases of combustion to drive the turbine wheel (10, 20). A rotary compressor (10, 14) is coupled to the turbine wheel to be driven thereby. The compressor (10, 14) is a radial discharge compressor with an impeller having blades (14) extending from an inlet end (40) to a discharge end (42) and a shroud (18) to the blades (14). Two axially spaced annular ports (44, 46; 44, 50) are adjacent the discharge end (42). The one of the ports (44, 46) nearer the shroud (18) is connected to the bleed air consuming system (84, 86) with the other of the ports (44, 50) being connected to the combustor (32) to provide compressed air thereto. Variable inlet guide vanes (76) are adjacent the inlet ends (40) and extend only partially across the inlet (74) thereto so that varying the position of the vanes (76) will vary the volume of air discharged into only one of the ports (44, 46; 44, 50).

7 Claims, 1 Drawing Sheet

AUXILIARY POWER UNIT FOR USE IN AN AIRCRAFT

FIELD OF THE INVENTION

This invention relates to an auxiliary power unit intended for use in an aircraft and, more specifically, one intended to be subject to varying demands for bleed air, hydraulic pressure and electrical energy.

BACKGROUND OF THE INVENTION

Most aircraft of complexity include main propulsion engines which are employed in flight, as well as in taxiing, to generate not only energy for propulsion, but energy for use in running aircraft systems. Typically, energy is delivered to various systems in the form of so-called "bleed air", hydraulic fluid under pressure, and electrical energy. As is well-known, bleed air is employed in the operation of the aircraft's environmental control system which is to say air-conditioning system. Because the bleed air is typically taken from the compressor section of a gas turbine engine, it typically is at an elevated temperature and thus is used for de-icing purposes as well. In those instances where one engine may not be running and it is desired to start the same, bleed air may be also utilized to power an air turbine starter motor for the quiescent engine.

Hydraulic fluid under pressure is utilized to alter aircraft control surfaces, assist steering while on the ground, and elevate and lower the landing gear. Electrical energy is used for lighting, and powering various control systems on the aircraft as well as aircraft avionics.

In many instances, it is desirable to have one or more forms of energy available without operating the main propulsion engines. This is due to the fact that the main propulsion engines, to provide bleed air, hydraulic or electrical power without providing propulsion for the aircraft consume unnecessarily large quantities of fuel in the process. Consequently, to minimize fuel consumption and yet provide the necessary forms of power, so-called auxiliary power units or "APUs" have been deployed on many aircraft. In the usual case, an APU is a small gas turbine engine. The same is not designed for thrust production. Rather, it is designed so that the energy of burnt fuel will be converted into rotary motion of a turbine rotor which in turn is coupled through a transmission to electrical generators and hydraulic pumps to provide electrical and hydraulic power. And because the APU is a gas turbine engine, it necessarily will include a compressor for compressing air to be delivered to the APU combustor to support the combustion of fuel therein to drive a turbine wheel. Bleed air is thus available from the compressor of the APU or from a so-called "load compressor" driven by the APU.

While these units work well for their intended purpose, they are not as fuel efficient as they might be. In particular, demands for hydraulic power, electric power and bleed air may be and frequently are totally independent of one another. At the same time, as is well-known, gas turbine engines of the type employed in APUs operate most efficiently when operated at a constant speed. Consequently, when there may be a high demand for one or two forms of energy, say, electrical and hydraulic power, there may be a low demand for bleed air and in conventional practice, in such a case, much more bleed air than is required will be generated. Not infrequently, the system will dump or spill the excess bleed air which, of course, represents a waste of energy.

Furthermore, those APUs employing load compressors that are separate from the gas turbine compressor are more complex than is desirable as well as more expensive to manufacture.

As a result, attempts have been made to develop a dual or "split" flow centrifugal compressor. See C. J. Paine, "Dual Pressure Ratio Compressor" ASME 89-GT121 and G. Eisenlohr, "Stromungsprobleme bei einem Entnahmeverdichter neuartiger Konstruktion" VDI Berichte, Nr. 264, 1976. The objective was to provide, from a single stage centrifugal compressor, relatively low pressure bleed air flow to bleed air system and relatively higher pressure compressed air flow to the turbine combustor. Unfortunately, these proposals while demonstrating the feasibility of such systems, failed to achieve sufficiently high performance so as to be readily accepted technology in the field of APUs.

The present invention is directed to overcoming one or more of the above problems.

SUMMARY OF THE INVENTION

It is the principal object of the invention to provide a new and improved auxiliary power unit for use on aircraft. More specifically, it is an object of the invention to provide such an APU that includes a dual flow, single stage centrifugal compressor by which both bleed air and turbine air may be provided.

An exemplary embodiment of the invention achieves the foregoing in an auxiliary power unit including a rotary turbine wheel along with a dual flow, radial discharge compressor connected to the turbine wheel to be driven thereby and including two axially spaced volutes or annular ports and a compressor shroud extending from a compressor inlet to one of the volutes. A transmission is connected to the turbine wheel to be driven thereby and is adapted to be connected to a load requiring a rotary input such as a pump or a generator. The one volute is adapted to be connected to a bleed air consuming system such as a de-icing system or an environmental control system. A combustor is connected to the other of the volutes for receiving compressed air therefrom along with fuel from a source to combust the fuel and provide gases of combustion to the turbine wheel to drive the same. Variable inlet guide vanes are located at the compressor inlet and extend only partially into the inlet stream thereat so that varying the position of the guide vanes will vary the volume of air discharged by the impeller into one of the volute connected to the bleed air system. As a consequence, by varying the position of the vanes, by moving the same towards a closed or blocking position for low bleed air demand conditions, the APU may be run at constant speed with maximum efficiency and fuel consumption being dictated by the demand for rotary power.

In a preferred embodiment, the variable inlet guide vanes are movably mounted on the shroud.

In a highly preferred embodiment, the variable inlet guide vanes are immediately adjacent the shroud.

The invention also contemplates that the compressor include an inducer section and that a bleed passage in the shroud be located at the inducer section.

In a highly preferred embodiment, the radius of the impeller at the volute connected to the bleed air consuming system is less than the radius at the other volute which is connected to the combustor.

Other objects and advantages will become apparent from the following specification taken in connection with the accompanying drawing.

DESCRIPTION OF THE DRAWING

The FIGURE is a partial schematic, partial sectional view of an APU made according to the invention.

DESCRIPTION OF THE PREFERRED EMBODIMENT

Figure 1:
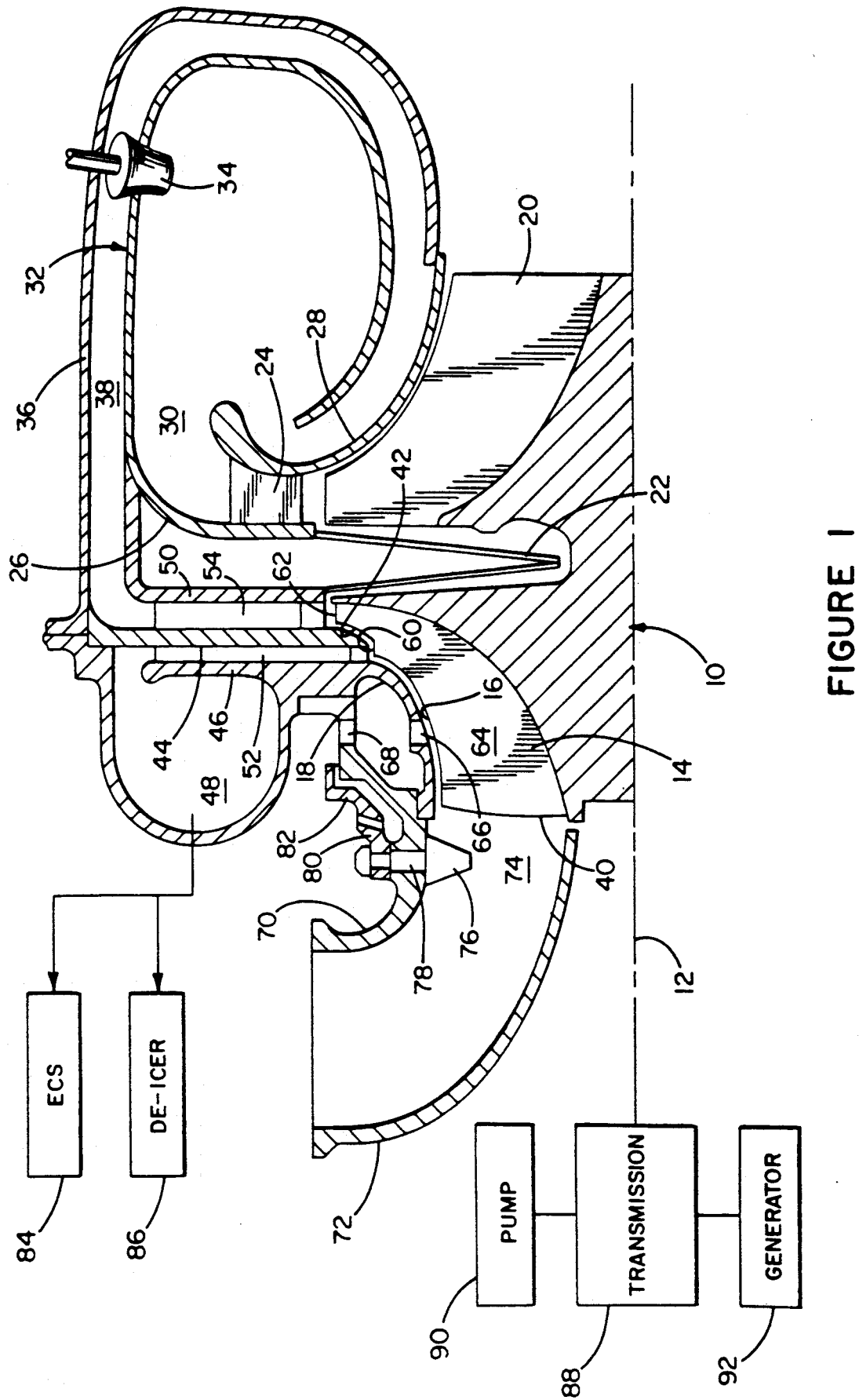

An exemplary embodiment of the invention is illustrated in the drawings in the form of a so-called radial turbine having a rotor, generally designated 10, rotatable about an axis defined by a shaft shown schematically at 12. On one end, the rotor 10 includes a plurality of swept compressor blades 14 whose radially outer edges 16 move in close proximity to a compressor shroud 18 which confines gas against the blades 14.

Turbine blades 20 are located on the side of the rotor 10 opposite of the compressor blades 14 and a conventional seal 22 separates the blades 14 from the blades 20.

A nozzle made up of a plurality of nozzle vanes 24 extending between a front engine shroud 26 and a rear engine shroud 28 is located at the outlet 30 of an annular combustor 32. Known fuel and air injection assemblies 34 are located circumferentially about the combustor 32 for providing combustion air and fuel from a source to the interior of the combustor whereat it may be burned to provide gases of combustion for propelling the turbine wheel defined by the blades 20 on the rotor 10. In this regard, the combustor 32 is contained within a combustor case 36 in spaced relation thereto. The space between the two defines an annular plenum 38 in which compressed air is available to cool the combustor 32, enter the combustor 32 adjacent the outlet 30 to provide dilution air, and enter via the assemblies 34 to provide combustion air.

Returning to the compressor side of the rotor, the blades 14 include inlet ends 40 and discharge ends 42. Adjacent the discharge ends is a diffuser plate 44 which is generally parallel to and interposed between a radial wall 46 forming part of a volute 48 and a radial wall 50 which serves in part to mount the seal 22. The diffuser plate 44 is spaced from both of the walls 46 and 50 and diffuser vanes 52 extend between the plate 44 and the wall 46 while diffuser vanes 54 extend between the plate 44 and the wall 50.

At the radially outer ends of the vanes 54, the diffuser plate 44 merges with the combustor case 36 while the wall 50 extends axially to the combustor 32. As a consequence, compressed air discharged from the discharge ends 42 of the blades 14 and passing between the plate 44 and the wall 50 is directed at relatively high pressure to the plenum 38 for the purposes mentioned previously. In contrast, air discharged at the discharge end 42 of the blades 14 and passing between the wall 46 and the plate 44 enters the volute 48. In this regard, it will be noted that the wall 46 is in effect a continuation of the shroud 18. It will also be noted that the radius of the discharge ends 42 is less at that section 60 thereof discharging into the area between the plate 44 and the wall 46 than at an axially adjacent section 62 which discharged between the plate 44 and the wall 50. This assures that the higher pressure air will be directed to the combustor 32 rather than to the volute 48.

As is well-known, in radial discharge compressors of the type illustrated, the same includes an inducer section 64 in the vicinity of the inlet ends 10. At about the end of the inducer section, the shroud 18 is provided with a circumferential series of openings 66 (only one of which is shown) which serve as an inducer shroud bleed. Through the bleed aperture 66, high loss fluid flowing along the shroud in the inducer section is extracted from the main flow path to increase the efficiency of the system.

The shroud bleed may be discharged from a passage 68 to the ambient.

A continuation 70 of the shroud forwardly of the inlet ends 40 of the blades 14 together with a radially inwardly located, bell-shaped wall 72 define an annular inlet space 74 immediately adjacent the inlet ends 40 of the blades 14. Variable inlet guide vanes 76 are located on shafts 78 journalled in the shroud 70 peripherally about the inlet space 74. On the side of the shroud 70 remote from the inlet, the shafts 78 are secured to gear segments 80 which in turn are meshed with a ring gear 82 journalled on the shroud for rotation about the shaft 12. As a consequence, it will be appreciated that rotation of the ring gear 82 will cause the vanes 76 to move between open and closed positions relative to the inlet 74.

A most important feature of the invention is the fact that the inlet guide vanes 76 extend only partially into the inlet 74, and thus the entering air stream, and in the preferred embodiment, are located immediately adjacent the shroud 70. As a consequence, rotation of the inlet guide vanes 76 will alter flow through the compressor along the radially outer edges 16 of the blade, but will not influence flow passing radially inwardly and closer to the shaft 12. Thus, the vanes 76 control the flow of air being discharged off of the section 60 of the discharge ends 42 of the blades 14 while not affecting the flow from the section 62 of the discharge ends 42. Thus, the vanes 76 do not affect the flow of high pressure compressed air to the combustor 32 while affecting the flow of lower pressure compressed air to the volute 48.

The volute 48 is connected via suitable piping to any bleed air consuming system. Typically, this might include the aircraft environmental control system 84 or a de-icing system 86. It might also include a connection (not shown) to air turbine starter motors for the main propulsion engines.

The shaft 12 is coupled to a transmission 88 which in turn is coupled to one or more hydraulic pumps 90 and an electrical generator 92. Thus, the pump or pumps 90 and the generator 92 are driven by the shaft 12 via the transmission 88.

As can be readily appreciated from the foregoing, system loading can be readily altered to meet demand through the usual control parameters, based on the need for rotational power to the pump or pumps 90 and the generator 92. This will, as is well-known, generally involve driving the rotor 10 at a constant speed. To conserve energy and maximize efficiency, sensors associated with the bleed air consuming systems may determine the demand for bleed air and through conventional servo systems, control the positioning of the vanes 76. When the demand for bleed air is low, the vanes 76 may be moved progressively toward a closed position so as to limit the inflow of air to be compressed by rotation of the blades 10 that will ultimately be delivered to the volute 48, thereby conserving energy. As demand for bleed air increases, the vanes 78 may be progressively moved toward an open position so that energy expended in compressing bleed air 48 is only that required to meet the demand.

This system eliminates wasteful dumping of excess bleed air. Furthermore, it is believed that the use of a surge bypass valve and associated ducting conventionally required in APUs employing a load compressor may be avoided. The invention also provides a single rotor that provides compression for both a bleed air system and for the turbine. The reduced number of parts results in lower cost and higher reliability.

Other advantages will be apparent to those skilled in the art.

I claim:

1. An auxiliary power unit comprising:
  a rotary turbine wheel;
  a dual flow, radial discharge compressor connected to said turbine wheel to be driven thereby and including two axially spaced volutes and a compressor shroud extending from a compressor inlet to one of said volutes;
  a transmission connected to said turbine wheel to be driven thereby and adapted to be connected to a load requiring a rotary input such as a pump or a generator;
  said one of said volutes being adapted to be connected to a bleed air consuming system such as a de-icing system or an environmental control system;
  a combustor connected to the other of said volutes for receiving compressed air therefrom and fuel from a source to combust the fuel and provide gases of combustion to said turbine wheel to drive the same; and
  variable inlet guide vanes at said compressor inlet and extending from said shroud only partially into the inlet stream thereat so that varying the position of said guide vanes will vary the volume of air discharged by said compressor into said one of said volutes.

2. An auxiliary power unit for an aircraft comprising:
  means defining at least one bleed air consuming system such as an environmental control system or a de-icing system;
  an electric generator;
  a hydraulic pump;
  a rotary turbine wheel;
  a transmission connected to said turbine wheel and to said generator and said pump whereby said turbine wheel may drive said generator and said pump;
  a combustor for receiving fuel and compressed air and producing gases of combustion to drive said turbine wheel;
  a rotary compressor coupled to said turbine wheel to be driven thereby and being a radial discharge compressor with an impeller having blades extending from an inlet end to a discharge end of said impeller, a shroud for said blades and an annular inlet adjacent said inlet end of said impeller;
  two axially spaced volutes adjacent said discharge end of said impeller, the one of said volutes nearer said shroud being connected to said bleed air consuming system and the other of said volutes being connected to said combustor to provide compressed air thereto;
  a plurality of variable inlet guide vanes circumferentially spaced about said inlet and mounted on said shroud to extend only partially across said annular inlet so that varying the position of the vanes will vary the volume of air discharged into the one of said volutes;
  whereby said turbine may be driven at substantially a constant speed with variations in loading thereon accommodated by varying the position of said guide vanes; and
  an inducer bleed passage in said shroud.

3. An auxiliary power unit for an aircraft comprising:
  means defining at least one bleed air consuming system;
  an electric generator;
  a hydraulic pump;
  a turbine wheel for driving said generator and said pump;
  a combustor for receiving fuel and compressed air and producing gases of combustion to drive said turbine wheel;
  a rotary compressor coupled to said turbine wheel to be driven thereby, said compressor being a radial discharge compressor with an impeller having blades extending from an inlet end to a discharge end and a shroud for said blades;
  two axially spaced, annular ports adjacent said discharge end, the one of said ports nearer said shroud being connected to said bleed air consuming system; the other of said ports being connected to said combustor to provide compressed air thereto; and
  variable inlet guide vanes adjacent said inlet end and extending only partially thereacross such that varying the position of said vanes will vary the volume of air discharged into only one of said ports.

4. The auxiliary power unit of claim 3 wherein said variable inlet guide vanes are movably mounted on said shroud.

5. The auxiliary power unit of claim 4 wherein said variable inlet guide vanes are immediately adjacent said shroud and said only one of said ports is a bleed air port.

6. The auxiliary power unit of claim 3 wherein said compressor includes an inducer section and further including a bleed passage in said shroud at said inducer section.

7. The auxiliary power unit of claim 3 wherein the radius of said impeller at said one of said ports is less than the radius at the other of said ports.

* * * * *